June 2, 1964  A. B. AGNEW  3,135,505
CHECKERBRICK FOR INDUSTRIAL HEATING FURNACES
Filed Oct. 19, 1961  2 Sheets-Sheet 1

INVENTOR.
Albert B. Agnew
BY William B. Jaspert
Attorney

June 2, 1964     A. B. AGNEW     3,135,505
CHECKERBRICK FOR INDUSTRIAL HEATING FURNACES
Filed Oct. 19, 1961     2 Sheets-Sheet 2
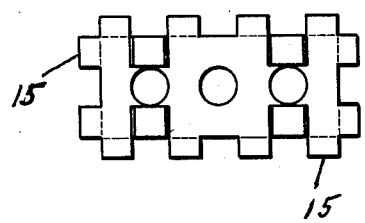
Fig. 4
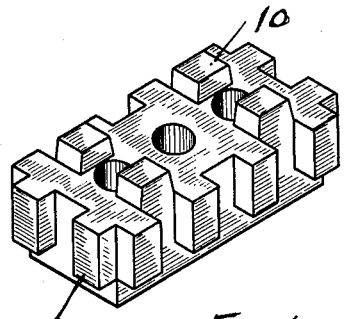
Fig. 6
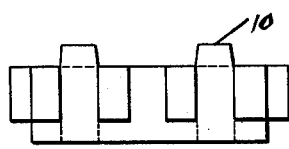
Fig. 5
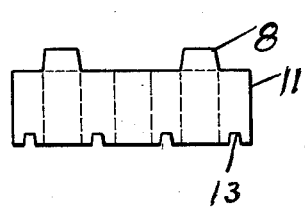
Fig. 7
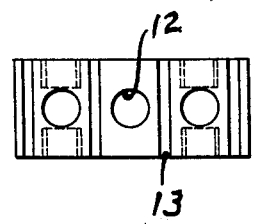
Fig. 8
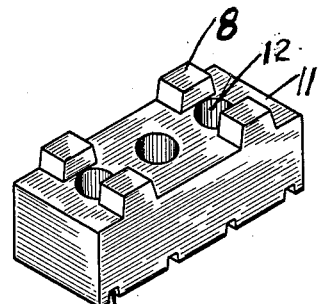
Fig. 9
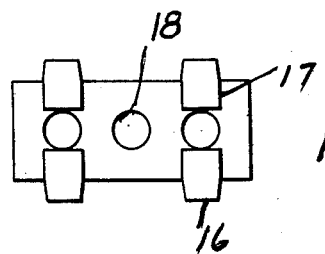
Fig. 10
Fig. 11
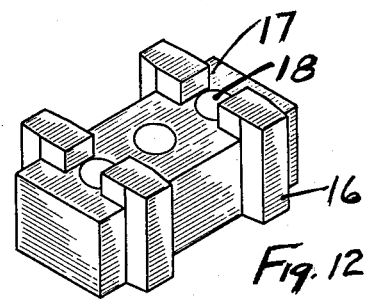
Fig. 12
INVENTOR.
Albert B. Agnew
BY William B. Jaspert
Attorney.

United States Patent Office 3,135,505
Patented June 2, 1964

3,135,505
CHECKERBRICK FOR INDUSTRIAL
HEATING FURNACES
Albert B. Agnew, Curtis Park, Philipsburg, Pa., assignor of thirty-three and one-third percent to William B. Jaspert, Allegheny County, Pa.
Filed Oct. 19, 1961, Ser. No. 146,263
2 Claims. (Cl. 263—51)

This invention relates to new and useful improvements in checkerbrick for industrial heating furnaces and the present application is a continuation-in-part of an application serially numbered 132,817 filed August 21, 1961.

In my former application, I have disclosed a checkerbrick for regenerators for hot blast stoves and the like which is designed to allow efficient conduction of heat to the entire mass of the checkertile without overheating sections thereof.

In accordance with the present invention, such checkerbrick may be modified to increase the mass of refractory material per brick without materially altering the shape thereof and without in any may interfering with the manner of laying the brick to form the checkertile structure.

It is a further object of the present invention to provide a checkerbrick having spacing lugs in which the bottom layer is a spacing and supporting layer which is inverted to interlock with the next adjacent top layer to properly space all of the checkertile structure in relation to the base and wall of the stove.

It is a further object of the present invention to provide a checkertile structure in which the bottom layer of checker shapes are made of cast metal and are grooved to rest on the edges of a grill work which constitutes the bottom support of the entire checkertile.

These and other objects of the invention will become more apparent from a consideration of the accompanying drawings constituting a part hereof in which like reference characters designate like parts and in which.

Figure 3:
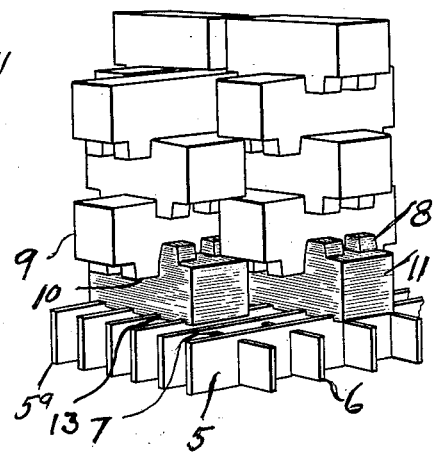

FIGURE 3 a view in perspective of the assembled tile and grill;

FIGURE 4 is a top plan view of a modified form of checkertile having lugs around the perimeter of the brick in addition to the spacing lugs on one face of the brick;

FIGURE 5 is a side elevation of the lug shown in FIGURE 4;

FIGURE 6 a view in perspective of the lugs shown in FIGURES 4 and 5;

FIGURES 7, 8 and 9 are side elevations, bottom plan and view in perspective of metal cast checker shapes for mounting on the grillwork of a checkertile structure;

FIGURES 10, 11 and 12 are top plan, side elevation, and view in perspective of a modified form of checkerbrick used as a damper course between a plurality of layers of the regular checkertile to control the temperature of the checkertile throughout the checkerwork structure in different sections thereof.

With reference to FIGURES 1, 2, 3, 7, 8 and 9 of the drawing, the numeral 1 designates a wall of a blast furnace stove, the numeral 2 a passage through which the products of combustion escape from the furnace and through which air is drawn into the stove to pass through the vertical flues to the top of the stove to become preheated. The numeral 3 designates supporting columns such as I-beams on which are mounted cross beams 4 that support a grillwork 5, more clearly shown in FIGURE 3 of the drawing. As noted in FIGURE 3, the grillwork consists of relatively wide bars 5a and narrower bars 6 to provide a clearance 7 for the shapes to be supported by the grill in the manner shown in FIGURE 3.

Figure 1:
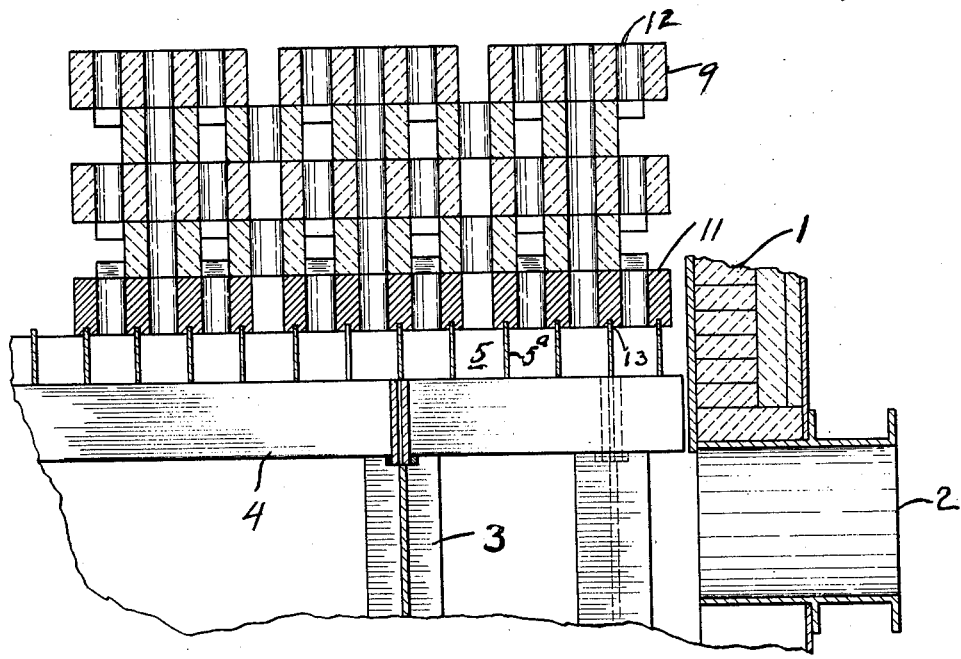
FIGURE 1 is a vertical section, partially in elevation, of a portion of a checkertile and supporting grill structure in a hot blast stove.

Described in my co-pending application referred to above, the bottom row of checkers are inverted with their spacing lugs 8 at the top to interact with the refractory checkerbrick 9 having spacing lugs 10 that engage the walls of the bottom brick 11. This bottom brick is preferably made of cast metal and is shown in detail in FIGURES 7, 8 and 9. It has exactly the same shape as the refractory brick 9 having the vertical flue openings 12 that are in register with similar openings in the refractory brick 9. As shown in FIGURES 7 and 9, the cast metal shapes are provided with grooves or slots 13 which rest on the wide bars 5a of the grillwork. As shown in FIGURES 1 and 3, the clearance 7 is sufficient to allow the cast metal shapes 11 to rest in the grooves 13 without interfering with the narrow bars 6, FIGURE 3. By means of the grooves 13, the bottom cast shapes 11 are locked against transverse movement in one direction and by means of the interacting lugs 10 of the refractory brick 9 that are depending downward, as shown in FIGURE 3, to engage the side faces of the metal cast shapes 11, the checkerwork is restrained against lateral movement in the other direction, so that the checkertile structure, when built up, is a self-sustaining and self-supporting structure without the need of retaining side walls, which however are provided to retain the gaseous heat and air within the confines of the stove.

Figure 2:
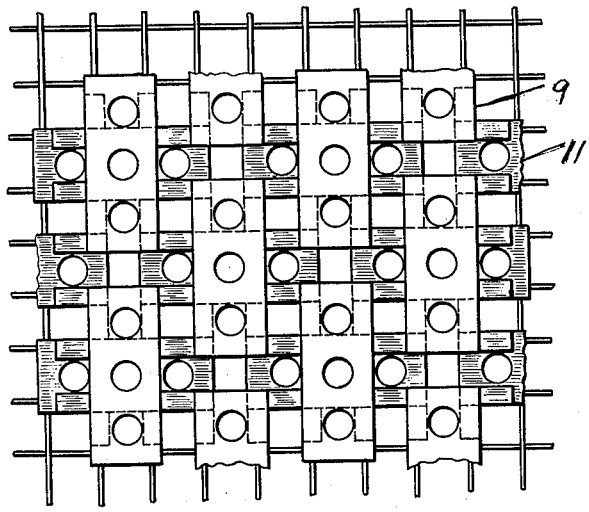
FIGURE 2 is a top plan view of a portion of the checkertile and supporting grill.

The checkertile structure can be built entirely from the refractory shapes shown in FIGURES 1 to 3 with the bottom cast metal layer inverted as described. It may, however, be desirable to form at least a portion of the checkertile structure of shapes having more refractory mass for heat retention purposes if that is necessary or desired. For that purpose, the refractory checkertile, as shown in FIGURES 4, 5 and 6, may be employed. It is like the refractory checkertile 9 of FIGURES 1 to 3 except that it has lugs 15 around the periphery thereof which is the side and end face of the brick. It retains the regular spacing lugs 10 of the tile in FIGURES 1 to 3 that act in the same manner as those shown in FIGURE 3. The refractory shape of FIGURES 4 to 6 may be used with the bottom inverted metal cast shapes 11 of FIGURES 1 to 3 so that no special shape of supporting brick is needed.

Also, as stated in my former application, the damper courses utilize a special checkerbrick having lugs on the side faces which are designated by the reference character 16 and also spacer lugs 17 to maintain alignment of the flue holes 18 as in the other shapes herein referred to.

It is evident from the foregoing description of this invention that checkertile made in accordance therewith provide a structure that is self-sustaining and not movable when subject to temperature changes. Further, there are no forces acting to crush or displace the tile since they are expandable per se because of clearance but not movable in any lateral direction. By mounting the bottom metal cast shapes with their grooves interacting with their supporting grillwork, the tile can be rapidly laid in courses and where desired. The tile with the additional facing lugs 15 can be employed to increase the refractory mass and the tile of FIGURES 10 through 12 may be employed as damper courses to allow for heat control in different vertical sections of the stove to avoid the burning out of the checkertile at the top of the stove.

Also, the tile of FIGURES 4 through 6, with the peripheral lugs 15, may be utilized for a portion of the checkerwork such as in the center or the bottom where, because of its greater refractory mass, it can absorb the heat of the cooler gases after they leave the top of the checkerwork. By utilizing the type of checkerbrick without the peripheral lugs 15, as shown in FIGURES 1, 2 and 3 of the drawings at the top of the checkerwork structure, the extremely hot gases can pass through at a faster rate to reach the checkertile near the center or bottom of the furnace having the peripheral heat absorbing lugs 15.

Also, the combination of all four tile may be employed in a single checkertile structure; that is, the metal cast bottom blocks, the open work refractory tile of FIGURES 1 to 3, the refractory tile with the peripheral lugs of FIGURES 4 and 6 and the damper course tile of FIGURES 10, 11 and 12, thus giving considerable latitude in checkertile design for hot blast stoves.

Although several embodiments of the invention have been herein illustrated and described, it will be evident to those skilled in the art that various modifications may be made in the details of construction without departing from the principles herein set forth.

I claim:

1. In a checkerbrick structure for regenerators and the like having a housing wall with inlets and outlets at the top and bottom constituting reversible gas and air flow passages and having a supporting grillwork of metal for the checkerbrick, the combination of brick-shaped cast metal bodies and refractory bodies of similar shape, said cast metal and refractory bodies having flue openings and having upper and lower horizontal faces one of which is flat and the other having pairs of spacing lugs extending perpendicular thereto with the lugs of the cast metal bodies extending in an upward direction parallel to the direction of and laterally of the flue openings and the lugs in the refractory bodies extending in a downward direction parallel to the direction of and laterally of the flue openings, said cast metal bodies having grooves in the lower flat face thereof for seating on the bars of the supporting grillwork to align the flue openings with the openings of the grillwork, the respective pairs of lugs of each body being longitudinally spaced to straddle the width of a vertically adjoining body to thereby bring the flue openings of adjacent rows of refractory and cast metal bodies in vertical alignment.

2. A checkerbrick structure as set forth in claim 1 in which some of the refractory brick have lugs extending from the lateral side faces to increase the refractory mass of the brick.

References Cited in the file of this patent

UNITED STATES PATENTS

| | | |
|---|---|---|
| 1,721,938 | Amsler | July 23, 1929 |
| 1,908,143 | Grilli | May 9, 1933 |
| 1,927,834 | Hughes | Sept. 16, 1933 |
| 1,951,579 | Pohl et al. | Mar. 20, 1934 |
| 1,961,258 | Totzek | June 5, 1934 |
| 2,451,392 | Kennedy | Oct. 12, 1948 |
| 2,651,515 | Agnew et al. | Sept. 8, 1953 |
| 3,044,861 | Hasche | July 17, 1962 |

FOREIGN PATENTS

| | | |
|---|---|---|
| 204,214 | Germany | July 27, 1907 |
| 372,632 | Great Britain | May 12, 1932 |